United States Patent [19]
Kondo et al.

[11] Patent Number: 5,793,542
[45] Date of Patent: Aug. 11, 1998

[54] AUTOMOBILE MIRROR ASSEMBLY

[76] Inventors: Hiroshi Kondo, 29-17, Aza-Hachigaike, Ooasa-Miyoshi, Miyoshi-cho, Nishikamo-gun, Aichi-ken; Shinji Oota, 20-16, Hirako 2-chome, Minami-ku, Nagoya-shi, Aichi-ken; Tomoyasu Yamada, 69-1, 70-2, Tomioka, Sango-cho, Owariasahi-shi, Aichi-ken; Harumasa Oota, 72-1, Yutaka, Ooshima-cho, Toyota-shi, Aichi-ken; Hiroyoshi Kondo, 40, Kaminogo, Igaya-cho, Kariya-shi, Aichi-ken, all of Japan

[21] Appl. No.: 768,671

[22] Filed: Dec. 18, 1996

Related U.S. Application Data

[63] Continuation of Ser. No. 540,711, Oct. 11, 1995, abandoned.

[30] Foreign Application Priority Data

Oct. 11, 1994 [JP] Japan .................................. 6-272812

[51] Int. Cl.$^6$ .............................. G02B 5/10; B60R 1/06
[52] U.S. Cl. ........................ 359/864; 359/866; 359/868
[58] Field of Search ................................. 359/838, 864, 359/866, 868, 872

[56] References Cited

U.S. PATENT DOCUMENTS

| | | | |
|---|---|---|---|
| 1,872,905 | 8/1932 | Darling | 359/868 |
| 2,778,273 | 1/1957 | Fellmeth | 359/864 |

(List continued on next page.)

FOREIGN PATENT DOCUMENTS

| | | | |
|---|---|---|---|
| 0210757 | 2/1987 | European Pat. Off. | 359/864 |
| 2420452 | 10/1979 | France | 359/868 |
| 1939756 | 2/1971 | Germany | 359/868 |
| 1941895 | 3/1971 | Germany | 359/868 |
| 2703206 | 8/1978 | Germany | 359/868 |
| 0051635 | 4/1980 | Japan | 359/868 |
| 0106403 | 8/1980 | Japan | 359/868 |
| 0105103 | 5/1987 | Japan | 359/868 |
| 1279158 | 6/1972 | United Kingdom | 359/868 |

OTHER PUBLICATIONS

David Emil Thomas; "Mirror Images"; Scientific American; Dec. 1980; pp. 206–224.

Primary Examiner—Ricky D. Shafer
Attorney, Agent, or Firm—Frishauf, Holtz, Goodman, Langer & Chick

[57] ABSTRACT

An automobile mirror assembly improves safety during driving of a car by widening the visual field of the driver with little distortion. The mirror is mounted on a car with a support member and a holding member to be adjustable in its position. A gradually changing mirror section is provided on at least one of an upper, lower and side edges of a main mirror section of the mirror. A surface of a gradually changing mirror section is defined by a plurality of intersections between curved surfaces provided in at least one of a vertical and horizontal directions with hyperbolic curves provided in a direction perpendicular to one of the vertical and horizontal directions. Each respective curved surface passes through circular arcs, the radii of curvatures of the circular area being calculated from Equation 1 indicated below. The radii of curvatures of the circular arcs gradually become smaller in an extending direction. The intersection of the hyperbolic curves and the curved surfaces define the surface of the gradually changing mirror. The Equation 1 is as follows:

$$\Sigma_i f(xn) = 1 + \frac{1}{\sqrt{1 - \{(K+1) \times c^2 \cdot xn^2\}} +} \{(A1) \times x1^{-1}\} +$$
$$\{(A2) \times x2^{-2}\} + \{(A3) \times x3^{-3}\} \ldots +$$
$$\{(An-1) \times xn - 1^{-(N-1)}\} \times \{(An) \times xn^{-n}\}$$

where: A1, A2, . . . An-1, An are asphericity factors representing asphericity at respective portions in the at least one of the horizontal and the vertical directions, n is any integer, K=0, and C=1/r0, and wherein r0 represents a radius of curvature at a starting position of the gradually changing mirror section.

3 Claims, 8 Drawing Sheets starting position of gradual change

U.S. PATENT DOCUMENTS

| | | | |
|---|---|---|---|
| 2,857,810 | 10/1958 | Troendle | 359/868 |
| 3,389,952 | 6/1968 | Tobin, Jr. | 359/864 |
| 3,764,201 | 10/1973 | Haile | 359/868 |
| 4,035,064 | 7/1977 | Cowman, Jr. et al. | 359/868 |
| 4,258,979 | 3/1981 | Mahin | 359/868 |
| 4,264,144 | 4/1981 | McCord | 359/868 |
| 4,331,382 | 5/1982 | Graff | 359/868 |
| 4,449,786 | 5/1984 | McCord | 359/868 |
| 5,005,962 | 4/1991 | Edelman | 359/866 |
| 5,096,281 | 3/1992 | Windebank et al. | 359/868 | starting position of gradual change starting position of gradual change

AUTOMOBILE MIRROR ASSEMBLY

This application is a Continuation, of application Ser. No. 08/540,711, filed Oct. 11, 1995, now abandoned.

BACKGROUND OF THE INVENTION

1. Field of the Invention

The present invention relates to an automobile mirror assembly.

2. Description of the Prior Art

An outside rearview mirror, an inside rearview mirror, and an outside under view mirror are well known as an automobile mirror assembly for confirming rear and surrounding situation of a car. To increase a visual field for confirmation, Japanese Published Patent Application No. 4-20818, for example, proposes an automobile mirror assembly comprising a main rearview mirror section consisting of a curved body and being of a rectangular the longitudinal direction of which lies in the vertical direction, wherein a point is as an intersection on one side edge of the main mirror section at a location near the upper edge, another point being set as another intersection on the other side edge at a location near the lower edge, an inclined line being established to be orthogonal to the line connecting these intersections at its middle point, a boundary being established with a circular arc with a predetermined radius which has its center on said inclined line and passes through said intersections, another boundary being established with a circular arc with a radius larger than said one which has the same center, and intersects said side edge at a location near the lower edge and the lower edge near the other side edge, these boundaries defining a rearview zone consisting of a curved surface which is offset to the other upper side region and occupies substantially one half area of the main rearview mirror section, an under view zone consisting of a curved surface which is located in the lower side region of the main rearview mirror section, and a junction zone consisting of a curved surface which connects both said zones, and wherein a line is established to perpendicularly pass through said middle point, the radius of curvature of the curved surface for the rearview zone the center of which is positioned on said line being caused to have a predetermine value, the radius of curvature of the curved surface for the under view zone the center of which is positioned on said line being made smaller than that of the rearview zone, the radius of curvature of the curved surface for the junction zone the center of which is positioned on said line being made smaller that of the rearview zone but larger than that of the under view zone, the radius of curvature at each boundary being sequentially translated and continuing from a large radius of curvature to a smaller one by causing the latter to inscribe the former.

BRIEF SUMMARY OF THE INVENTION

Object of the Invention

However, the automobile mirror described in the above published patent application integrally combines a mirror with large curvature with a mirror with small curvature through a junction region, in which images reflected significantly differ in the mirror with large curvature and the mirror with small curvature. Accordingly, it is very difficult to accurately determine the distance to the object to be confirmed. Moreover, if the image of the object to be confirmed extends over the mirror with large curvature, the junction region, and the mirror with small curvature, because the longitudinal and lateral ratios of the image greatly differ from a region to another and the image in the junction region is distorted, the object cannot be accurately determined.

The present invention is made to overcome the above-mentioned conventional disadvantages, and intended to provide an automobile mirror assembly which can improve safety during driving of a car by widening the visual field for confirmation in the rear and surroundings of the car with a simple arrangement.

Another object of the present invention is to provide an automobile mirror assembly which allows the driver to accurately determine the object to be confirmed by reflecting it in a state with little distortion.

Still another object of the invention is to provide an automobile mirror assembly which reflects the object to be confirmed in constant longitudinal and lateral ratios so that the driver can determine accurate distance.

SUMMARY OF THE INVENTION

To this end, the present invention is an automobile mirror assembly comprising a mirror which is mounted on a car with a support member and a holding member so as to be adjustable in position A gradually changing mirror section has a surface defined by a plurality of intersections of curved surfaces formed in at least one of a horizontal and a vertical direction and assumed hyperbolic curves formed in a direction perpendicular to the at least one of the horizontal and the vertical directions, the curved surfaces passing through circular arcs having radii of curvatures, the circular arcs are calculated from Equation 1 hereinbelow, and the circular arcs gradually become smaller in the one of the horizontal and the vertical directions; and wherein the assumed hyperbolic curves intersect the curved surfaces at the plurality of intersections; and wherein Equation 1 is as follows:

$$\Sigma f(xn) = 1 + \frac{1}{\sqrt{1-\{(K+1) \times c^2 \cdot xn^2\}+}} \{(A1) \times x1^{-1}\} +$$
$$\{(A2) \times x2^{-2}\} + \{(A3) \times x3^{-3}\} \ldots +$$
$$\{(An-1) \times xn - 1^{-(N-1)}\} \times \{(An) \times xn^{-n}\}$$

where:

A1, A2, . . . An-1, An are asphericity factors representing asphericity at respective portions in the at least one of the horizontal and the vertical direction, n is any integer, K=0, and C=1/r0, wherein r0 represents a radius of curvature at a starting position of a gradual change in the gradually changing mirror section; the mirror, to have the curved surfaces passing through circular arcs the radii of curvature of which gradually become smaller in an extending direction, and to have hyperbolic curves, the intersection between the curved surfaces at a plurality of positions with the assumed hyperbolic curves define the surface of the gradually changing mirror section so that the intersections occur in a direction perpendicular to the extending direction.

DETAILED DESCRIPTION OF THE PREFERRED EMBODIMENTS

Figure 1:
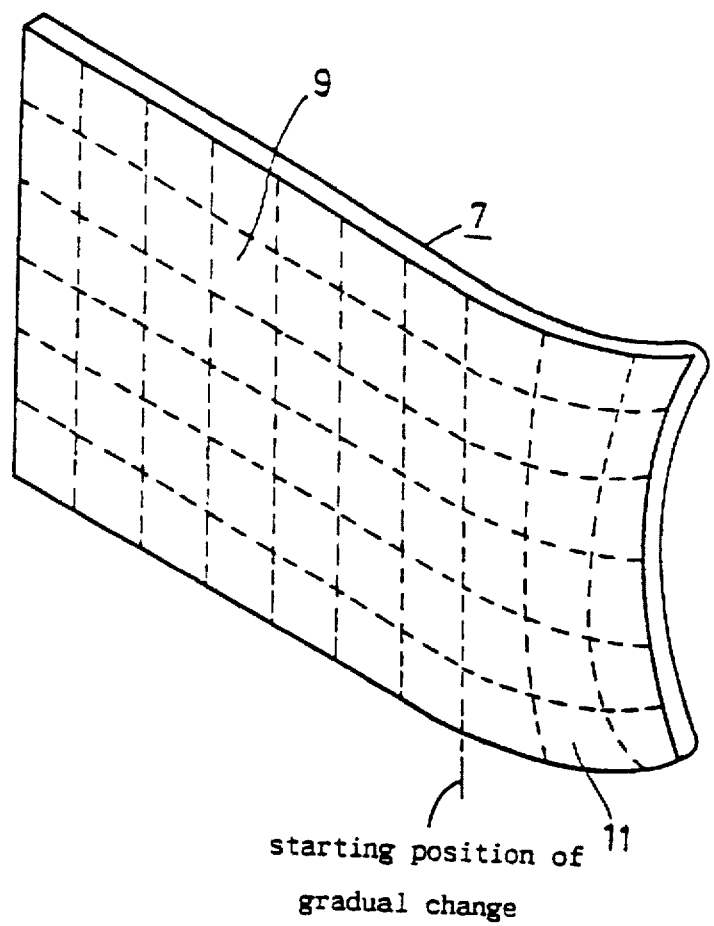
FIG. 1 is a diagram illustrating curvatures on a gradually changing mirror section.
Figure 2:
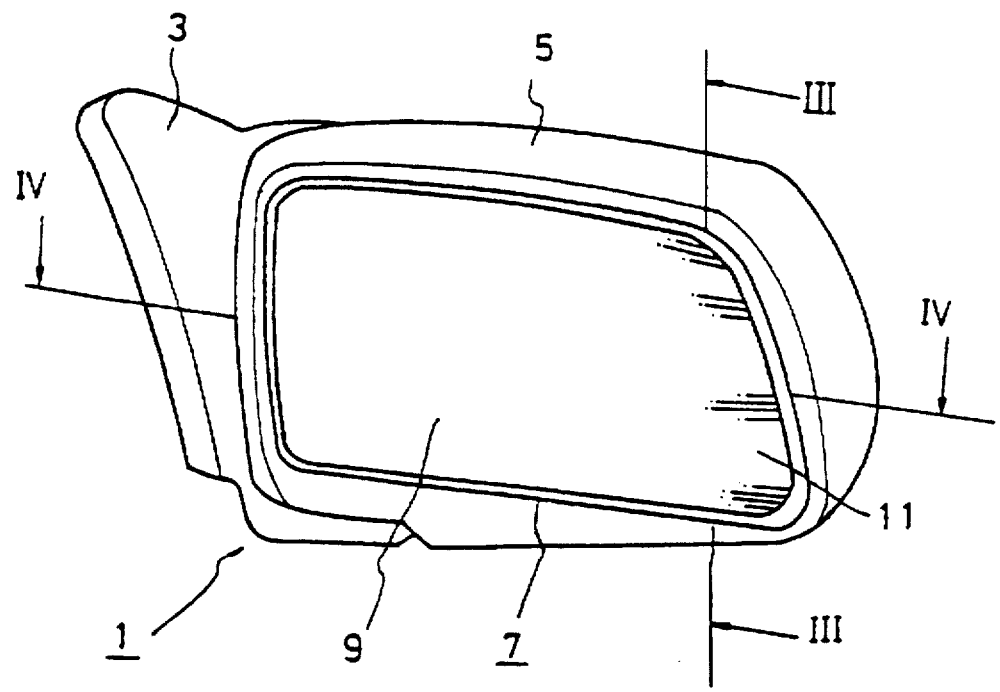
FIG. 2 is a perspective view showing the overview of an outside rearview mirror assembly.
Figure 3:
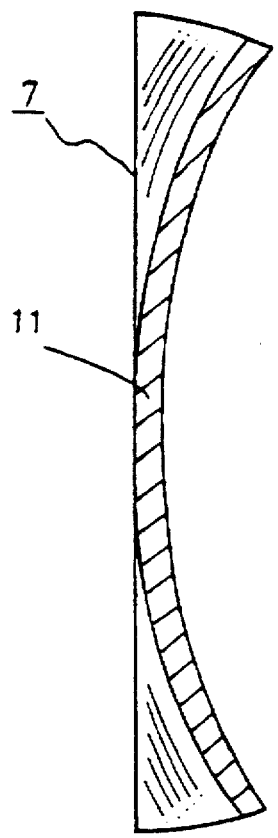
FIG. 3 is a longitudinal sectional view of FIG. 2 taken along line III—III.
Figure 4:
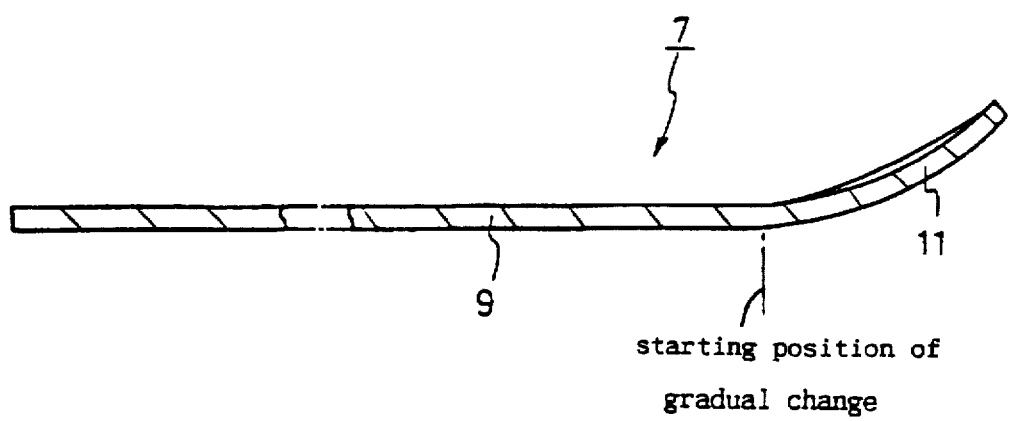
FIG. 4 is a cross sectional view of FIG; 2 taken along line IV—IV.

Now, an embodiment of the present invention is described according to the drawings which show the present invention embodied in an outside rearview mirror.

Referring to FIGS. 1–8, an outside rearview mirror assembly 1 as an automobile mirror assembly (although FIGS. 1–4 show only the right outside rearview mirror, the left one is of a symmetrical shape so that its illustration and detailed description are omitted) is foldably mounted on a door of a car (both being not shown) through a support member 3. A mirror 7 is mounted adjustably for its position on a holding section 5 of the outside rearview mirror assembly 1.

The mirror 7 is made of glass or synthetic resin which is surface or back plated, and comprises a main mirror section 9 and a gradually changing mirror section 11 disposed at the right to the main mirror section 9. The main mirror section 9 is substantially formed in a plane mirror. The boundary between the main mirror section 9 and the gradually changing mirror section 11 is established as a starting position of gradual change.

The gradually changing section 11 is formed to have a composite curvature comprising curved surfaces provided in at least one of a horizontal and a vertical direction and hyperbolic curves assumed to exist in a direction perpendicular to the at least one of the horizontal and vertical directions, wherein the curved surfaces pass through circular arcs, the circular arcs having radii of curvatures which are calculated by Equation 1 below such that the radii of curvatures become smaller in a direction toward the right, and wherein the assumed hyperbolic curves intersect with the curved surfaces at a plurality of intersections to define a surface of the gradually changing mirror section; and wherein Equation 1 is as follows:

$$\Sigma f(xn) = 1 + \frac{1}{\sqrt{1-\{(K+1) \times c^2 \cdot xn^2\}} +} \{(A1) \times x1^{-1}\} +$$

$$\{(A2) \times x2^{-2}\} + \{(A3) \times x3^{-3}\} \ldots +$$

$$\{(An-1) \times xn - 1^{-(N-1)}\} \times \{(An) \times xn^{-n}\}$$

where:

A1, A2, An-1, An are asphericity factors representing asphericity at respective portions in the at least one of the horizontal and the vertical directions, n is any integer, K=0, and C=1/r0, wherein r0 represents a radius of curvature at a starting position of a gradual change in the gradually changing mirror section.

Figure 5:
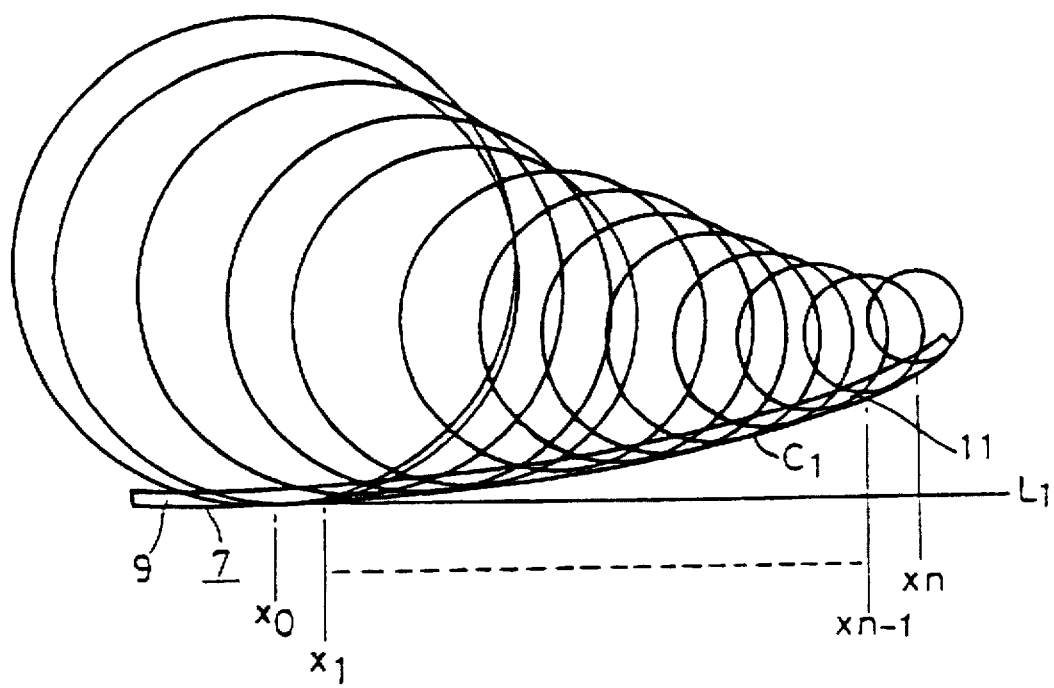
FIG. 5 is a view illustrating how curved surfaces are formed in the horizontal direction on the gradually changing mirror section.

As shown FIG. 5, a line L1 is assumed to extend to the right from the middle point (x0) of the starting position of gradual change in the vertical direction. Then, the positions x1, x2, . . . , xn-1, xn are assumed to be on the line L1 with an equal interval from the starting position of gradual change. After the the radii of curvatures of the arcs at each position is calculated by substituting the value of each position x1, x2, . . . , xn-1, and xn for Equation 1, circles are drawn with the calculated radii of curvature around respective centers at positions corresponding to the asphericity factors A1, A2, . . . An-1, An to establish an aspherical line C1 commonly passing through these circles. The curved surfaces have radii of curvature which become smaller to the right from the starting position of gradual change, with the rightmost radius of curvature of, for example, 500 mm.

Moreover, orthogonal axes at respective positions x1, x2, . . . , xn-1, and xn on the line L1 are defined as Lx1, Lx2, . . . , Lxn-1, Lxn Ly1, Ly2, . . . , Lyn-1, Lyn, and intersections between Lx1, Lx2, Lxn-1, Lxn and the aspherical curve C1 are defined as a1, a2, . . . , an-1 and an.

Then, hyperbolic curves are created by defining hyperbolic curves passing through the intersections a1, a2, . . . , an-1 and an with the aspherical curve C1.

Figure 7:
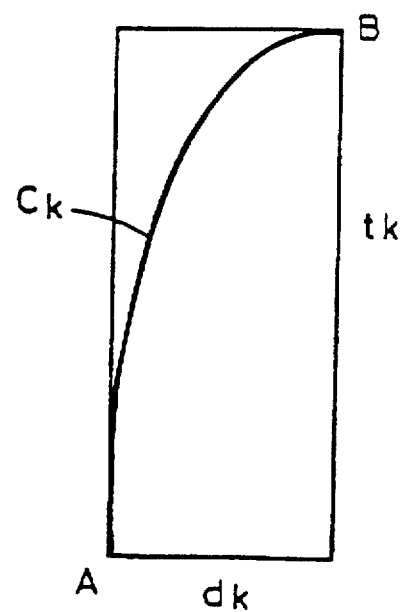
FIG. 7 is a view illustrating the principle hyperbolic curves in the horizontal direction on the gradually changing mirror section.
Figure 6:
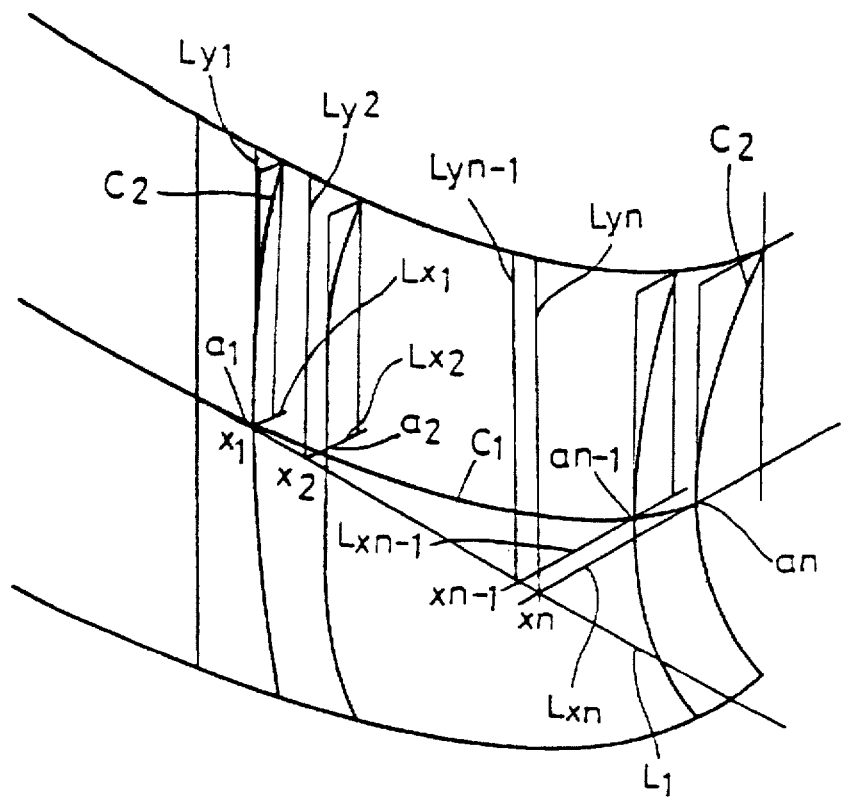
FIG. 6 is a view illustrating how hyperbolic curves are formed in the vertical direction on the gradually changing mirror section.

That is, respective curves C2 in the upper regions above the line L1 are defined as hyperbolic curves shown in FIG. 6. In FIG. 7, reference tk represents the height of the upper region above the line L1 on the gradually changing mirror section 11, reference dk represents the depth at the top of the gradually changing mirror section 11, reference A represents an intersection a α(α being any integer in a range of 1≦α≦n), and reference B represents the top end of the gradually changing mirror section 11 at the intersection a α.

Then, a hyperbolic curve Ck is determined to pass through diagonal corner positions A α and B α in a rectangular defined by the height tk and the depth dk.

This hyperbolic curve can be expressed by an equation $$x^2/a^2 - y^2/b^2 = 1.$$

Figure 8:
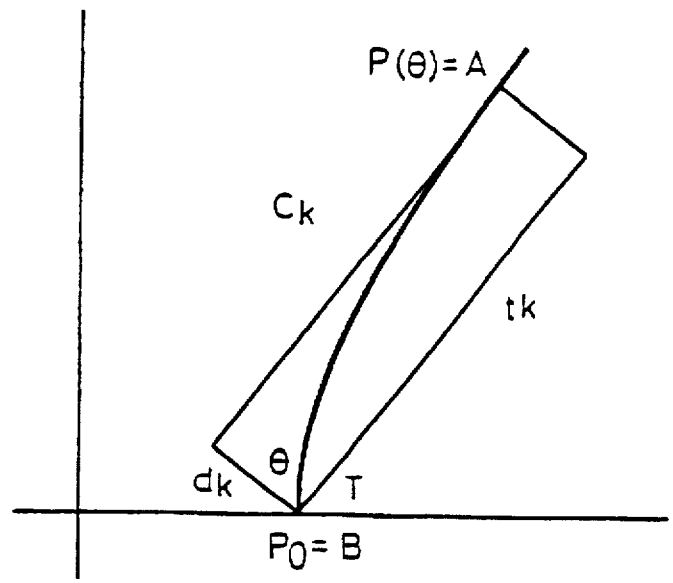
FIG. 8 is a view illustrating the principle for forming hyperbolic curves in the vertical direction on the gradually changing mirror section.

Then, a relationship defined by Equation 2 and shown in FIG. 8 can be established by assuming positions on the hyperbolic curve passing through the diagonal corners of a rectangular with diagonal corners P(θ) and P0, Ak=P(θ) and Bk=P0. [Equation 2]

$$P(\theta) = P0 + tk \cdot T + dk \cdot D$$

$$tk = \{P(\theta) - P0\} \cdot T$$

$$dk = \{P(\theta) - P0\} \cdot D$$

where T is unit component in height, while D is unit component in depth.

In addition, if the radius of curvature at the point P0 is R0, the following relationship can be established for a hyperbolic curve.

$$a + R0 \cdot b^2 = 0$$

In the above equation, since a is set to a value of respective positions a1, a2, . . . , an-1 and an with respect to the aspherical curve C1, and the radii of curvature R1, R2, . . . , Rn-1, and Rn at the respective positions a1, a2, . . . , an-1 and an are set to a desired value, the equation of hyperbolic curve is determined by calculating the value of b from the positions a1, a2, . . . , an-1 and an and the radii of curvature R1, R2, . . . , Rn-1, and Rn.

Now, a grid pattern reflected in the main mirror formed with the gradually changing section as described above is described.

Figure 9:
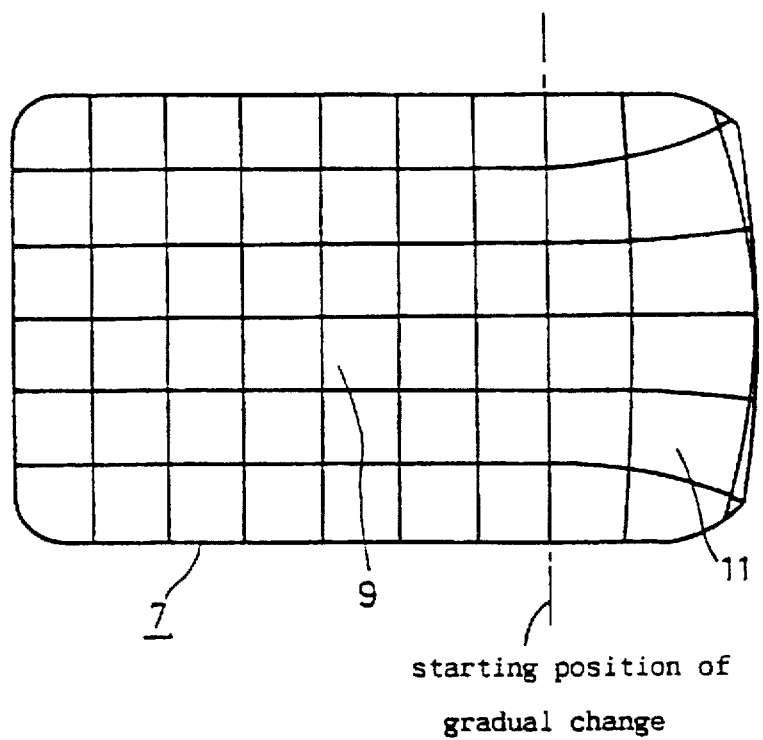
FIG. 9 is a grid pattern displayed on a screen.

Here, when a grid pattern with 10 mm interval is drawn on the mirror 7, and light is projected on the mirror 7, projected on a screen placed opposite to the mirror 7 is, as shown in FIG. 9, an image which is enlarged to have constant vertical and horizontal ratios from the starting position of gradual change to the right end and the upper and lower ends because the gradually changing mirror section 11 formed in a curved surfaces which are defined by Equation 1 for horizontal direction and the hyperbolic curves in a vertical direction. In this case, reflected in the gradually changing mirror section 11 of the mirror 7 is an image which is gradually contracted opposite to the image projected on the screen to have constant vertical and horizontal ratios from the starting position of gradual change to the right end and the upper and lower ends.

Now, how the rear visual field for confirmation is enlarged is described.

Figure 10:
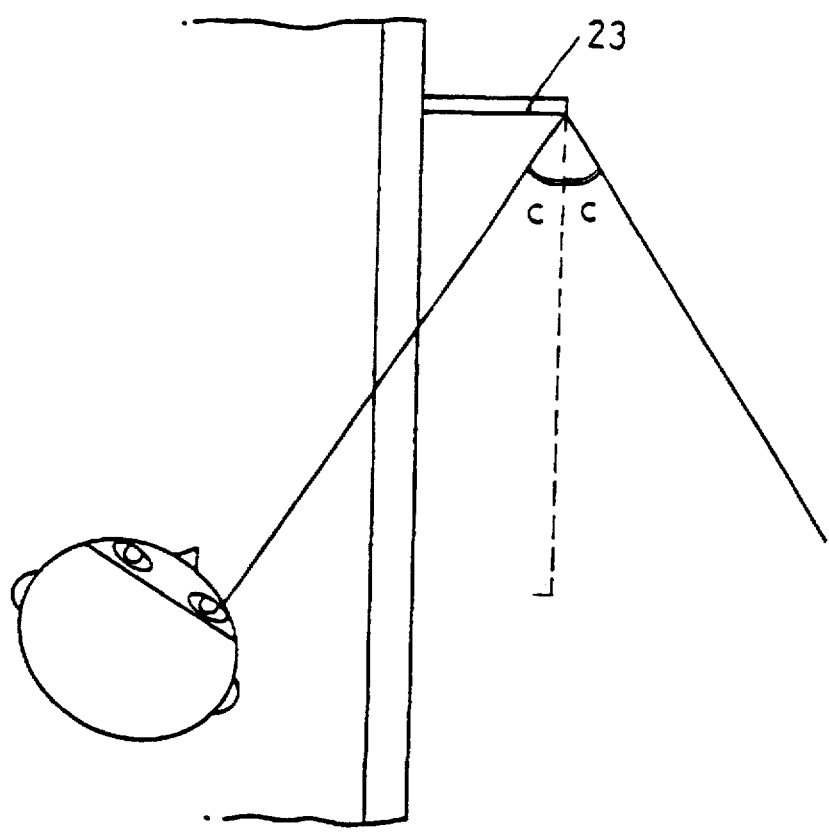
FIG. 10 is a view illustrating the rear visual field for confirmation of a conventional outside rearview mirror assembly.
Figure 11:
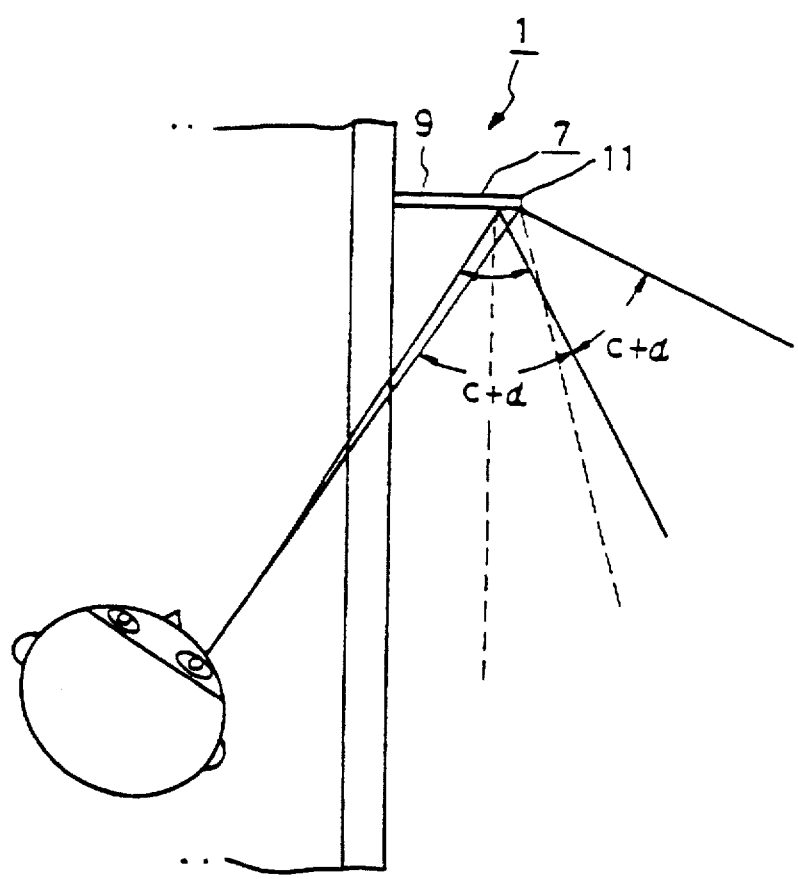
FIG. 11 is a view illustrating the rear visual field for confirmation of an outside rearview mirror assembly according to the present invention.

Referring to FIGS. 10 and 11, the rear visual field for confirmation on the conventional outside rearview mirror 21 is determined by the angle of line of sight of the driver to the right edge of the mirror 23. In this case, as shown in FIG. 10, the driver can view the rear with in an angle substantially matching the angle of line of sight c to a vertical line assumed to the right edge of the mirror 23. Contrary to this, as, on the outside rearview mirror assembly 1 according to the present invention, as shown in FIG. 11, the angle of line of sight to a vertical line assumed to any position on the gradually changing mirror section 11 can be increased from the conventional angle c by an angle α, the driver can view a wider range in the rear. In this case, as described above, because the gradually changing mirror section 11 can reflect an image at any position with constant vertical and horizontal ratios, it is possible to prevent the object reflected in any position from being enlarged in the vertical and horizontal direction so that the sense of distance to the reflected object can be maintained. Similarly, it is possible to prevent the image in the gradually changing mirror section 11 from being significantly distorted so that the object can be properly confirmed.

While, in the above description, the automobile mirror assembly is the outside rearview mirror assembly 1, and the gradually changing mirror section 11 is provided on the outer edge (right or left edge) of the main plane mirror section 9 of the mirror 7, the gradually changing mirror section 11 may be provided on the upper edge or the lower edge or both in addition to the outer edge. The main mirror section 9 of the mirror 7 may be a convex mirror with a large radius of curvature. In addition, the automobile mirror assembly may be an inside rearview mirror assembly. When the present invention is implemented on the inside rearview mirror assembly, the gradually changing mirror section may be provided at each outer edge of the main section and comprising a plane or convex mirror.

What is claimed is:

1. An automobile mirror assembly comprising:

a mirror which is mountable on an automobile with a support member and a holding member so as to be adjustable in position relative to the automobile;

said mirror having a gradually changing mirror section provided on at least one of side edges of a main mirror section of the mirror, the gradually changing mirror section having a compound curved surfaces comprising:

horizontal curved surfaces and vertical curved surfaces;

wherein curvatures of the horizontal curved surfaces become gradually smaller as the horizontal curved surfaces extend to the edge, and further said curvatures of said horizontal curved surfaces are calculated through the following Equation 1 in respective each positions (x1, x2 . . . xn-1, xn) provided in a horizontal direction; and wherein the vertical curved surfaces of respective each positions (x1, x2 . . . xn-1, xn) have curvatures which are determined from Equation 2 of hyperbolic curves;

wherein said Equation 1 is as follows:

$$\Sigma f(xn) = 1 + \left[ \frac{1}{\sqrt{1 - \{(K+1) \times c^2 \cdot xn^2\}}} + \right] \{(A1) \times x1^{-1}\} + $$
$$\{(A2) \times x2^{-2}\} + \{(A3) \times x3^{-3}\} \ldots +$$
$$\{(An-1) \times xn - 1^{-(N-1)}\} \times \{(An) \times xn^{-n}\}$$

where:

A1, A2, . . . An-1, An are arc asphericity factors representing asphericity at respective each positions (x1, x2 . . . xn-1, xn) provided in the horizontal direction, n is any integer, K=0, and C=1/r0, and wherein r0 represents a radius of curvature at a starting position of a gradual change in the gradually changing mirror section;

wherein said Equation 2 is as follows:

$$x^2/a^2 - y^2/b^{2-1}$$

$$P(\theta) = P0 + (tk \cdot T) + (dk \cdot D)$$

$tk = \{P(\theta) - P0\} \cdot T$, in units of height, $dk = \{P(\theta) - P0\} \cdot D$, in units of depth, where:

tk is the height of an upper region above the line of the gradually changing mirror section, dk is the depth at the top of the gradually changing mirror section, T is the unit component in height, D is the unit component of depth, a is the distance in the x direction, b is the distance in the V direction, x and y are Cartasian coordinates, P(θ) represents an optional position A on a curve extending in the lateral direction at the vertical middle portion of the gradually changing mirror section, and P0 represents the upper and lower ends of the gradually changing mirror section corresponding to the position A.

2. The automobile mirror assembly of claim 1 wherein said main mirror section of said mirror comprises a plane mirror section.

3. The automobile mirror assembly of claim 1, wherein said main mirror section of said mirror comprises a convex mirror section having a large radius of curvature.

* * * * *